United States Patent
Engels et al.

(10) Patent No.: US 6,612,594 B2
(45) Date of Patent: Sep. 2, 2003

(54) CONNECTOR ROD

(75) Inventors: Frank P. Engels, Solingen (DE); Peter J. Stroetgen, Wuelfrath (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 16 days.

(21) Appl. No.: 09/817,690

(22) Filed: Mar. 26, 2001

(65) Prior Publication Data

US 2002/0135148 A1 Sep. 26, 2002

(51) Int. Cl.$^7$ ............... B62D 7/16; B62D 7/20
(52) U.S. Cl. ............... 280/93.502; 280/93.51; 280/93.511
(58) Field of Search ............ 280/93.51, 93.511, 280/93.502, 93.512

(56) References Cited

U.S. PATENT DOCUMENTS

| | | | | |
|---|---|---|---|---|
| 3,113,787 A | * | 12/1963 | Lauderdale | 280/93.511 |
| 3,605,934 A | * | 9/1971 | Millard | 280/93.511 |
| 3,834,727 A | * | 9/1974 | Adams | 280/93.511 |
| 3,938,822 A | * | 2/1976 | Guerriero | 280/93.511 |
| 3,950,006 A | * | 4/1976 | Wood, Jr. | 280/93.511 |
| 4,059,361 A | | 11/1977 | Allison | |
| 4,146,340 A | | 3/1979 | Smith, Jr. | |
| 4,187,033 A | * | 2/1980 | Zukowski | 280/93.511 |
| 4,822,073 A | * | 4/1989 | Tanahashi et al. | 280/93.51 |
| 4,887,486 A | | 12/1989 | Wood, Jr. | |
| 4,953,894 A | | 9/1990 | Broszat et al. | |
| 4,995,755 A | * | 2/1991 | Hyodo et al. | 29/510 |
| 5,100,165 A | | 3/1992 | Hespelt | |
| 5,116,159 A | * | 5/1992 | Kern et al. | 29/898.044 |
| 5,405,162 A | | 4/1995 | Chun | |
| 5,522,281 A | | 6/1996 | Herman | |
| 5,529,316 A | * | 6/1996 | Mattila | 280/93.51 |
| 5,799,968 A | * | 9/1998 | Loeffler | 280/93.511 |
| 6,019,383 A | | 2/2000 | Kociba et al. | |
| 6,119,550 A | | 9/2000 | Engler et al. | |
| 6,164,860 A | * | 12/2000 | Kondo | 280/93.51 |
| 6,422,779 B1 | * | 7/2002 | Spagnuolo | 280/93.511 |

* cited by examiner

*Primary Examiner*—Paul N. Dickson
*Assistant Examiner*—Joselynn Y Sliteris
(74) *Attorney, Agent, or Firm*—Brinks Hofer Gilson & Lione

(57) ABSTRACT

A vehicle steering assembly comprising a vehicle steering system, a wheel assembly including a pivotal wheel hub for supporting a wheel, a knuckle mounted to the hub, and a pivot arm extending outward from the knuckle. The vehicle steering assembly further including a connector rod interconnecting the vehicle steering system and the pivot arm for transmitting linear motion from the vehicle steering system through the connector rod to rotate the wheel assembly. The connector rod including a first end connected to the vehicle steering system, a second end pivotally connected to the pivot arm, and a shaft portion interconnecting the first and second ends. The connector rod further including a first mechanism to allow the connector rod to pivot in a first plane in relation to the vehicle, and a second mechanism to allow the connector rod to pivot in a second plane, approximately orthogonal to the first plane.

14 Claims, 4 Drawing Sheets

US 6,612,594 B2

CONNECTOR ROD

TECHNICAL FIELD OF THE INVENTION

This patent discloses and claims a useful, novel, and unobvious invention for a connector rod for connecting a vehicle steering mechanism to a vehicle wheel assembly in the automotive field.

BACKGROUND

The suspension of a vehicle is typically designed to keep the vehicle's wheels in firm contact with the road and to provide a comfortable ride for the passengers. The vehicle suspension typically includes springs and shock absorbers that allow the vehicle wheels to move up and down independently of the vehicle. In this way, the wheels react to uneven driving surfaces with minimal reaction transferred to the rest of the vehicle. Connector rods (also known as "tie rods") connect a vehicle's steering mechanism to the vehicle's wheel assembly.

When the wheel assembly moves up and down, the end of the connector rod attached to the wheel assembly must move up and down as well. Since the opposite end of the connector rod is attached to the steering mechanism, that end does not move up and down. Consequently, the connection between the connector rod and the steering mechanism must allow the connector rod to pivot vertically with respect to the vehicle steering mechanism.

Further, the connection between the connector rod and the steering mechanism must also accommodate movement in the horizontal direction. As the wheel assembly pivots to turn the vehicle, the point of connection between the connector rod and the wheel assembly travels along an arcuate path. This happens because the connection between the connector rod and the wheel assembly is offset from the pivot axis of the wheel assembly. This is functionally necessary to facilitate transfer of linear movement from the steering mechanism to pivotal movement of the wheel assembly. Movement along this arcuate path causes the connection between the connector rod and the wheel assembly to move slightly forward and backward as the wheel assembly is turned. Throughout this movement, the angle between the connector rod and the wheel assembly in the horizontal plane changes. Therefore, the connection between the connector rod and the steering mechanism must accommodate pivotal movement of the connector arm in relation to the steering mechanism both vertically and horizontally.

In the past, this connection has been accomplished by using a ball joint which allows a wide degree of pivotal movement in either direction. However, the amount of movement in the horizontal plane is slight compared to the movement in the vertical plane. Due to the cost and weight factors associated with ball joints, there is a need for a connector rod with a simplified connection between the connector rod and the steering mechanism which will allow broad pivotal movement in the vertical direction as well as allowing limited pivotal movement in the horizontal direction.

DETAILED DESCRIPTION OF THE PREFERRED EMBODIMENT

Figure 1:
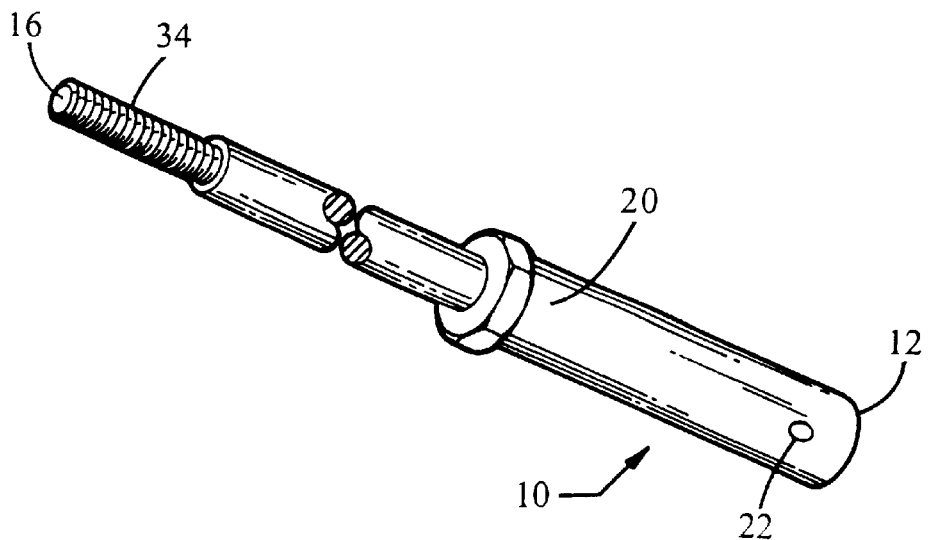
FIG. 1 is a perspective view of a connector rod of the present invention.

The following description of the preferred embodiments of the invention is not intended to limit the scope of the invention to these preferred embodiments, but rather to enable any person skilled in the art to make and use the invention.

Referring to the Figures, wherein like numerals indicate like or corresponding parts throughout the several views, a connector rod for linking a vehicle steering mechanism to a vehicle wheel assembly is shown generally at 10. The connector rod 10 includes a first end 12 connected to the vehicle steering mechanism 14, a second end 16 connected to the vehicle wheel assembly 18, and a shaft portion 20 interconnecting the first and second ends 12, 16.

Referring to FIG. 1, the first end 12 is adapted for pivotal connection to the vehicle steering mechanism 14. The pivotal connection allows the connector rod 10 to pivot in a first plane relative to the vehicle steering mechanism 14. Generally, the first plane is vertical and must be accommodated to allow vertical movement of the vehicle wheel assembly 18 as the vehicle drives over uneven surfaces. The suspension of a vehicle is typically designed to keep the vehicle's wheels in firm contact with the road and to provide a comfortable ride for the passengers. The vehicle suspension typically includes springs and shock absorbers that allow the vehicle wheels to move up and down independently of the vehicle. In this way, the wheels react to uneven driving surfaces with minimal reaction transferred to the rest of the vehicle.

Figure 2:
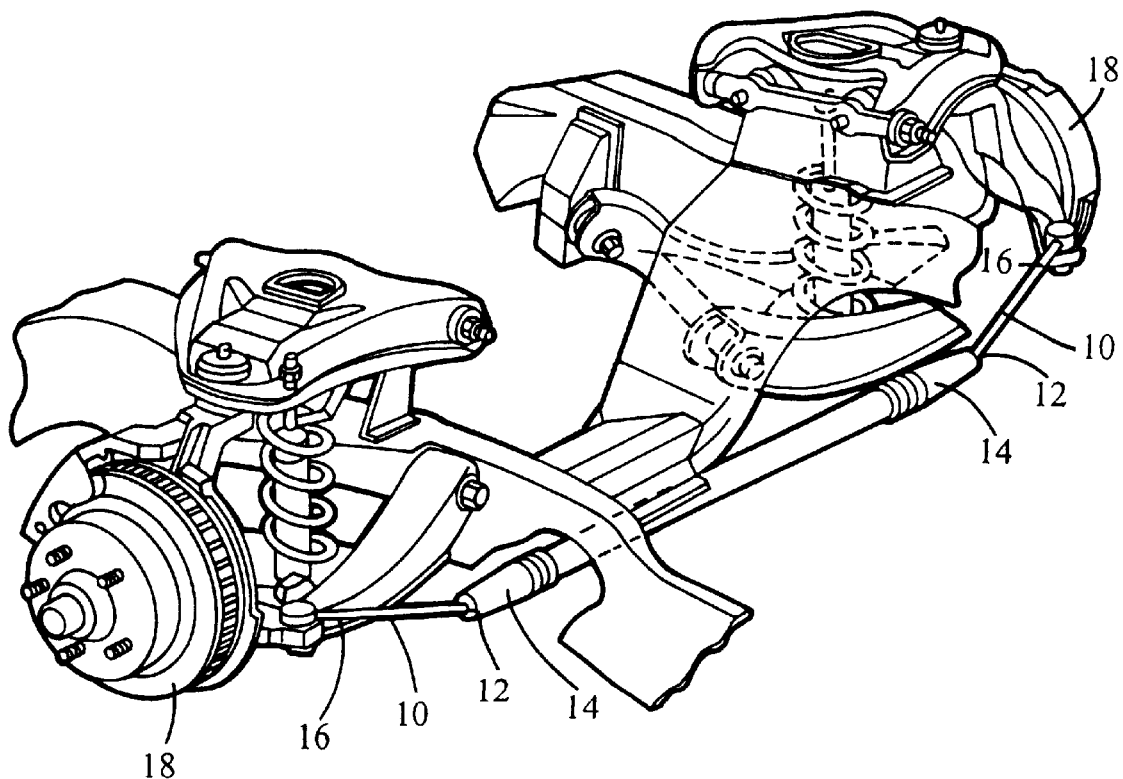
FIG. 2 is a perspective view of a portion of a vehicle wheel support structure including the vehicle steering mechanism and the vehicle wheel assembly.
Figure 3:
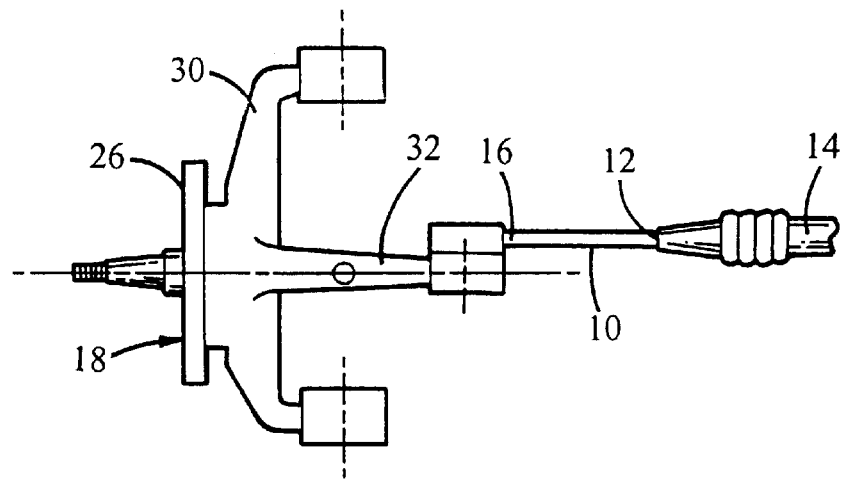
FIG. 3 is a front view of the connector rod interconnecting the vehicle wheel assembly and the vehicle steering mechanism shown when there is no relative movement between the wheel assembly and the steering mechanism.
Figure 4:
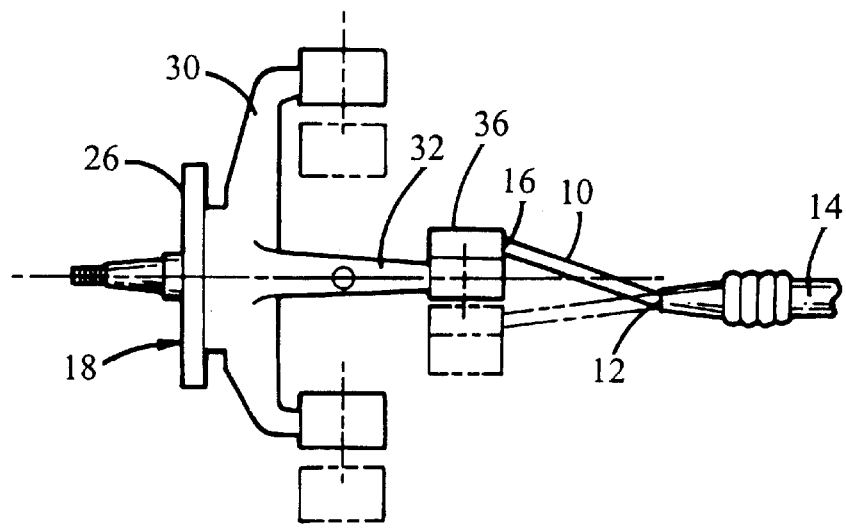
FIG. 4 is a front view of the connector rod interconnecting the vehicle wheel assembly and the vehicle steering mechanism shown when the wheel assembly has moved in a first plane with respect to the vehicle steering mechanism.

Referring to FIGS. 2 through 4, in a vehicle, connector rods 10 (also known as "tie rods") connect a vehicle steering mechanism 14 to the vehicle wheel assembly 18. Because the wheel assembly 18 moves up and down independently of the vehicle, and more importantly the steering mechanism 14, the connector rods 10 need to be able to pivot. When the wheel assembly 18 moves up and down, the second end 16 of the connector rod 10 must move up and down as well. Since the first end 12 of the connector rod 10 is attached to the steering mechanism 14, the first end 12 does not move up and down. The connection of the first end 12 of the connector rod 10 to the vehicle steering mechanism 14 is such to allow the connector rod 10 to pivot vertically with respect to the vehicle steering mechanism 14 as the second end 16 of the connector rod 10 moves up and down with the vehicle wheel assembly 18.

In the preferred embodiment, the second end 16 of the connector rod 10 includes an externally threaded section 34 for threaded engagement with a ball joint 36. It is to be understood however, that the connector rod 10 can be fastened or mounted to the ball joint 36 by other methods. The ball joint 36 is in turn mounted to the end of the pivot arm 32. The ball joint 36 allows pivotal movement of the second end 16 of the connector rod 10 in both the vertical and horizontal directions. The second end 16 could be mounted to the pivot arm 32 by other suitable methods that allow pivotal movement of the second end 16 of the connector rod 10 in both the vertical and horizontal directions.

Referring to FIGS. 3 and 4 the vehicle wheel assembly 18 can move up and down between a high point and a low point, as shown in FIG. 4. As the second end 16 of the connector rod 10 moves between the high point and the low point, the connector rod 10 must pivot radially about the first end 12 that is fixed with relation to the vehicle. The range of movement is typically on the order of approximately 60 degrees as shown at 21.

Figure 5:
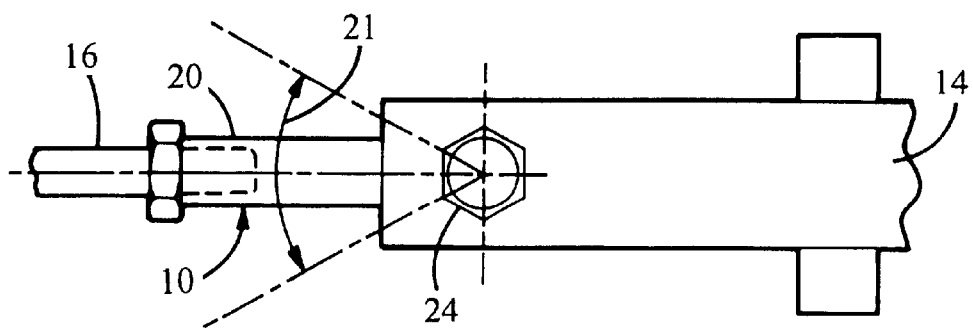
FIG. 5 is a front view of the connector rod.
Figure 6:
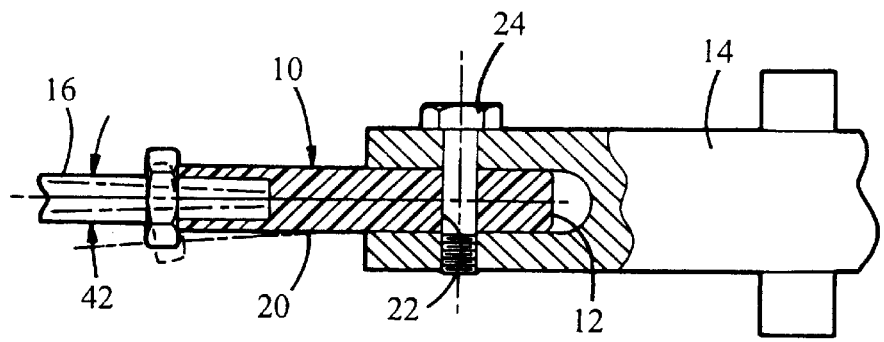
FIG. 6 is a partial sectional top view of the connector rod.

Referring to FIGS. 5 and 6, in the preferred embodiment, the first end 12 includes an aperture 22 extending through the connector rod 10 for receiving a corresponding support pin 24 that is mounted to the vehicle steering mechanism 14. The support pin 24 is oriented orthogonal to the connector rod 10 such that when the connector rod 10 is mounted to the pin 24, the connector rod 10 can pivot vertically about the pin 24.

Referring to FIGS. 6 through 9, the second end 16 of the connector rod 10 is mounted pivotally to the vehicle wheel assembly 18. The vehicle wheel assembly 18 preferably includes a pivotal wheel hub 26 for supporting a wheel (not shown), a knuckle 30 mounted to the wheel hub 26, and a pivot arm 32 extending outward from the knuckle 30. The pivot arm 32 preferably extends outward from the knuckle 30 so that the end of the pivot arm 32 is located away from the pivot point of the wheel assembly 18. Therefore, when the end of the pivot arm 32 is moved, the wheel assembly 18 pivots. The second end 16 of the connector rod 10 is pivotally mounted to the end of the pivot arm 32 to transfer motion of the steering mechanism 14 through the connector rod 10 to cause the wheel assembly 18 to pivot, thereby turning the vehicle.

Figure 7:
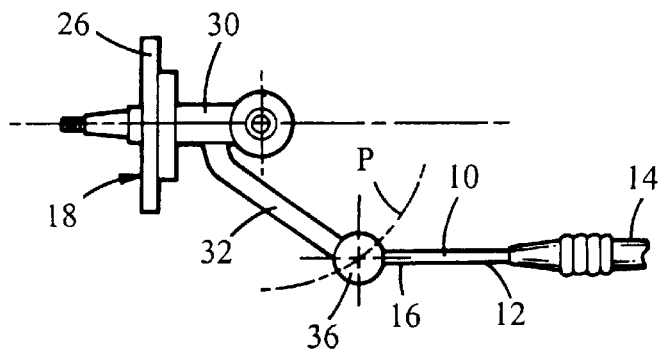
FIG. 7 is a top view of the connector rod interconnecting the vehicle wheel assembly and the vehicle steering mechanism shown when the vehicle wheels are aligned for straight line motion of the vehicle.
Figure 8:
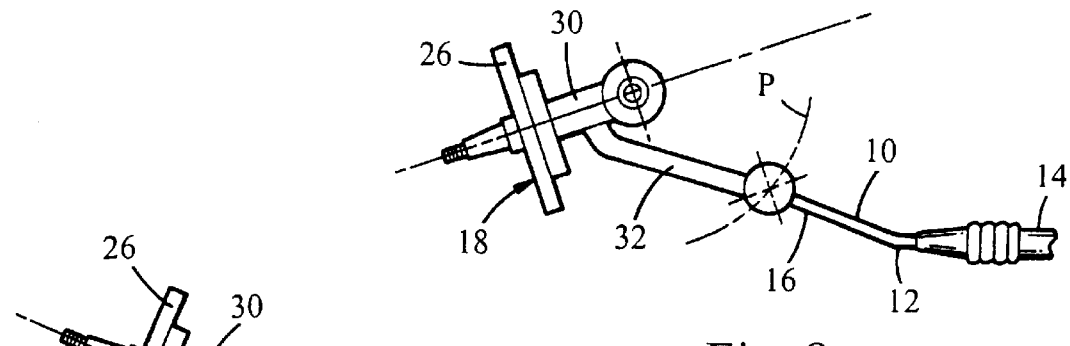
FIG. 8 is a top view of the connector rod interconnecting the vehicle wheel assembly and the vehicle steering mechanism shown when the vehicle wheels are angled for a left turn.
Figure 9:
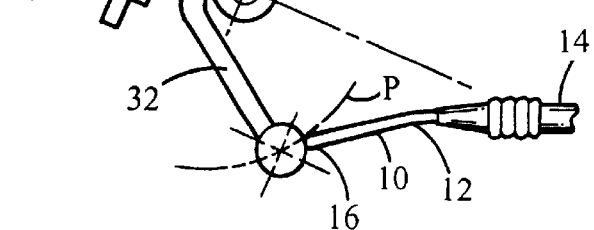
FIG. 9 is a top view of the connector rod interconnecting the vehicle wheel assembly and the vehicle steering mechanism shown when the vehicle wheels are angled for a right turn.

As the pivot arm 32 moves, the distal end of the pivot arm travels along an arcuate path, shown at "P" in FIGS. 7, 8 and 9, about the pivot axis of the wheel assembly 18. Movement along this arcuate path causes the second end 16 of the connector rod 10 to move slightly forward and backward as the wheel assembly 18 is turned. As the pivot arm 32 moves through the arcuate path, the angle between the connector rod 10 and the pivot arm 32 in the horizontal plane changes.

The connector rod 10 includes a shaft portion 20 interconnecting the first and second ends 12, 16. The shaft portion 20 is preferably formed from a flexible material to allow the connector rod 10 to deform in a second plane, approximately orthogonal to the first plane, in response to movement of the second end 16 of the connector rod 10 in the second plane. As the knuckle 30 moves to pivot the wheel assembly 18, the second end 16 of the connector rod 10 follows the arcuate path "P" about the pivot point of the wheel assembly 18. This causes the second end 16 of the connector rod 10 to move forward and backward slightly as the wheel assembly 18 pivots. The first end 12 of the connector rod 10 is only allowed to pivot in a first plane that is vertical with relation to the vehicle, so the connector rod 10 must compensate for the movement of the second end 16 in the horizontal direction.

As the second end 16 of the connector rod 10 moves between the forward extreme position and the rearward extreme position, the connector rod 10 must pivot radially about the first end 12 that is fixed with relation to the vehicle. The range of movement is approximately 5 to 8 degrees or less as shown at 42 in FIG. 6. To accommodate for the horizontal movement of the second end 16 of the connector rod 10, the shaft portion 20 of the connector rod 10 is flexible. This allows the second end 16 of the connector arm to move in the horizontal plane even though the first end 12 of the connector rod 10 cannot move or pivot in that direction. Preferably, the shaft portion 20 is made from fiber-reinforced compounds or spring steel. It is to be understood, however, that the shaft portion 20 can be formed from other materials displaying similar flexibility and strength properties.

Figure 10:
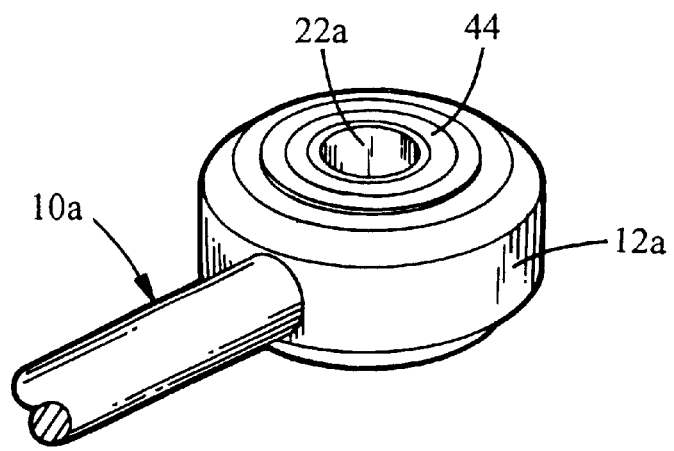
FIG. 10 is a perspective view of the first end of a second embodiment of the connector rod of the present invention.
Figure 11:
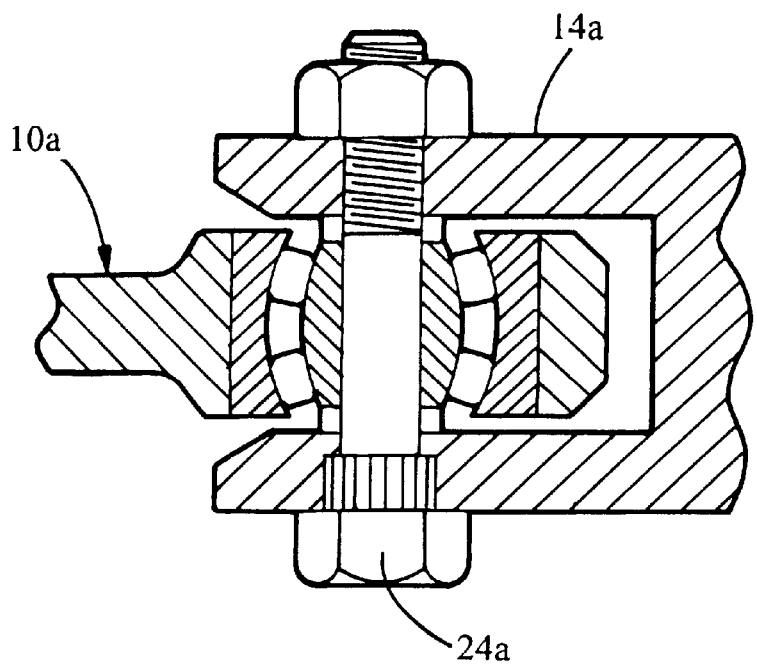
FIG. 11 is a top sectional view of the first end of the second embodiment shown mounted to the vehicle steering mechanism.

Referring to FIGS. 10 and 11, rather than having a flexible shaft portion 20, the first end 12a of the connector rod 10a can alternatively be mounted to allow total pivotal freedom in the vertical plane as well as allowing limited pivotal movement in the horizontal plane. In this second embodiment the first end 12a includes an aperture 22a extending through the connector rod 10a for receiving a corresponding support pin 24a that is mounted to the vehicle steering mechanism 14a. The pin 24a is oriented orthogonal to the connector rod 10a such that when the connector rod 10a is mounted to the support pin 24a, the connector rod 10a can pivot vertically about the support pin 24a.

In the second embodiment, the first end 12a includes a spherical bearing 44 disposed between the first end 12a of the connector rod 10a and the support pin 24a. The spherical bearing 44 allows a modest amount of pivotal movement of the connector rod 10a in relation to the steering mechanism 14a. The amount of pivotal movement allowed by the spherical bearing 44 is on the order of approximately 12 degrees. This is enough to accommodate the horizontal movement of the connector rod 10a due to movement of the second end 16. Typically, the amount of pivotal movement in the horizontal plane is on the order of 5 to 8 degrees, well within the 12 degrees that can be accommodated by the spherical bearing 44.

The invention has been described in an illustrative manner, and it is to be understood that the terminology which has been used is intended to be in the nature of words of description rather than of limitation. The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A connector rod for connecting a vehicle steering mechanism to a vehicle wheel, said connector rod comprising;
   a first end pivotally connectable to the vehicle steering mechanism to allow said connector rod to pivot in a first plane relative to the vehicle steering mechanism;

a second end adapted for connection to the vehicle wheel assembly;

a shaft portion interconnecting said first and second ends, said shaft portion being formed from a flexible material to allow said connector rod to deform in a second plane, approximately orthogonal to the first plane, in response to movement of said second end of said connector rod in the second plane.

2. The connector rod as set forth in claim 1, wherein said first end of said connector rod includes an aperture for receiving a support shaft of the vehicle steering mechanism, said aperture extending through said connector rod orthogonal to the first plane to allow said connector rod to pivot about the support shaft in the first plane.

3. The connector rod as set forth in claim 1, wherein said shaft portion is formed from a fiber reinforced compound.

4. The connector rod as set forth in claim 1, wherein said second end is cylindrical in shape and includes external threads for engaging a pivotal connection to the vehicle wheel assembly.

5. A vehicle steering assembly comprising;

a vehicle steering mechanism;

a wheel assembly including a pivotal wheel hub for supporting a wheel, a knuckle mounted to said hub, and a pivot arm extending outwardly from said knuckle;

a connector rod interconnecting said vehicle steering mechanism and said pivot arm for transmitting motion from said vehicle steering mechanism to said wheel assembly;

said connector rod including a first end pivotally connected to said vehicle steering mechanism to allow said connector rod to pivot in a first plane in relation to said vehicle steering mechanism, a second end pivotally connected to said pivot arm, and a shaft portion interconnecting said first and second ends;

said shaft portion being formed from a flexible material to allow said connector rods to deform in a second plane, approximately orthogonal to the first plane, in response to movement of said second end of said connector rod in the second plane.

6. The vehicle steering assembly as set forth in claim 5, wherein said vehicle steering mechanism includes a support shaft and said first end of said connector rod includes an aperture for receiving said support shaft, said support shaft being oriented orthogonal to the first plane to allow said connector rod to pivot about said support shaft in the first plane.

7. The vehicle steering assembly as set forth in claim 5, wherein said shaft portion of said connector rod is formed from a fiber reinforced compound.

8. The vehicle steering assembly as set forth in claim 5, wherein said second end of said connector rod is cylindrical in shape and includes external threads for engaging a connection to the vehicle wheel assembly.

9. The vehicle steering assembly as set forth in claim 8 including a ball joint disposed between and interconnecting said second end of said connector rod and said pivot arm to allow pivotal movement of said connector rod relative to said vehicle wheel assembly.

10. A vehicle steering assembly comprising;

a vehicle steering mechanism;

a wheel assembly including a pivotal wheel hub for supporting a wheel, a knuckle mounted to said hub, and a pivot arm extending outwardly from said knuckle;

a connector rod interconnecting said vehicle steering mechanism and said pivot arm for translating linear motion of said vehicle steering mechanism to pivotal motion of said wheel assembly;

said connector rod including a first end pivotally connected to said vehicle steering mechanism to allow said connector rod to pivot vertically in relation to said vehicle steering mechanism, a second end pivotally connected to said pivot arm of said wheel assembly to allow said connector rod to pivot both vertically and horizontally in relation to said wheel assembly, and a shaft portion interconnecting said first and second ends;

said shaft portion being formed from a flexible material to allow said connector rod to deform such that said first end of said connector rod is allowed to move horizontally in relation to said second end of said connector rod, thereby allowing pivotal motion of said wheel assembly.

11. The vehicle steering assembly as set forth in claim 10, wherein said vehicle steering mechanism includes a support shaft and said first end of said connector rod includes an aperture for receiving said support shaft, said support shaft being oriented horizontally to allow said connector rod to pivot vertically about said support shaft.

12. The vehicle steering assembly as set forth in claim 10, wherein said shaft portion of said connector rod is formed from a fiber reinforced compound.

13. The vehicle steering assembly as set forth in claim 10, wherein said second end of said connector rod is cylindrical in shape and includes external threads for engaging a connection to the vehicle wheel assembly.

14. The vehicle steering assembly as set forth in claim 13 including a ball joint disposed between and interconnecting said second end of said connector rod and said pivot arm to allow pivotal movement of said connector rod relative to said vehicle wheel assembly.

* * * * *

UNITED STATES PATENT AND TRADEMARK OFFICE
CERTIFICATE OF CORRECTION

PATENT NO.    : 6,612,594 B2
DATED         : September 2, 2003
INVENTOR(S)   : Frank P. Engels et al.

It is certified that error appears in the above-identified patent and that said Letters Patent is hereby corrected as shown below:

Column 5,
Line 38, delete "rods" and substitute -- rod -- in its place.

Signed and Sealed this

Ninth Day of December, 2003

JAMES E. ROGAN
*Director of the United States Patent and Trademark Office*